Dec. 16, 1941.  F. C. HOLTZ  2,266,423
ELECTRICAL MEASURING APPARATUS
Filed Oct. 30, 1939  3 Sheets-Sheet 2
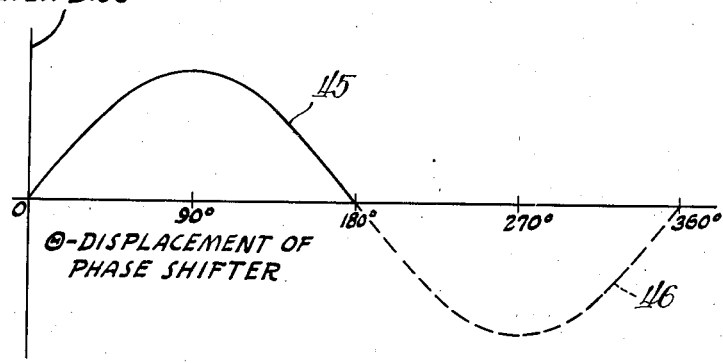
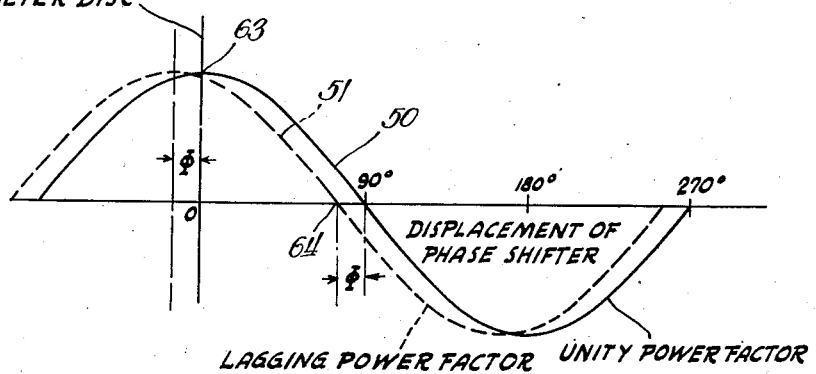
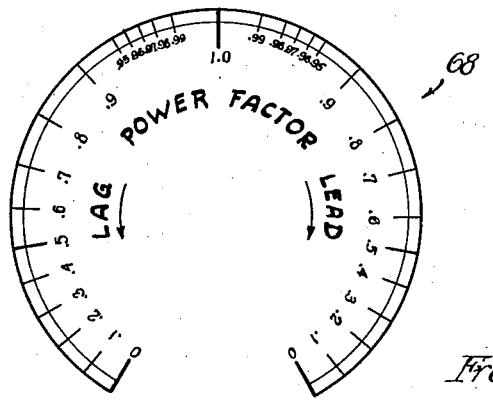
Inventor:
Frederick C. Holtz.

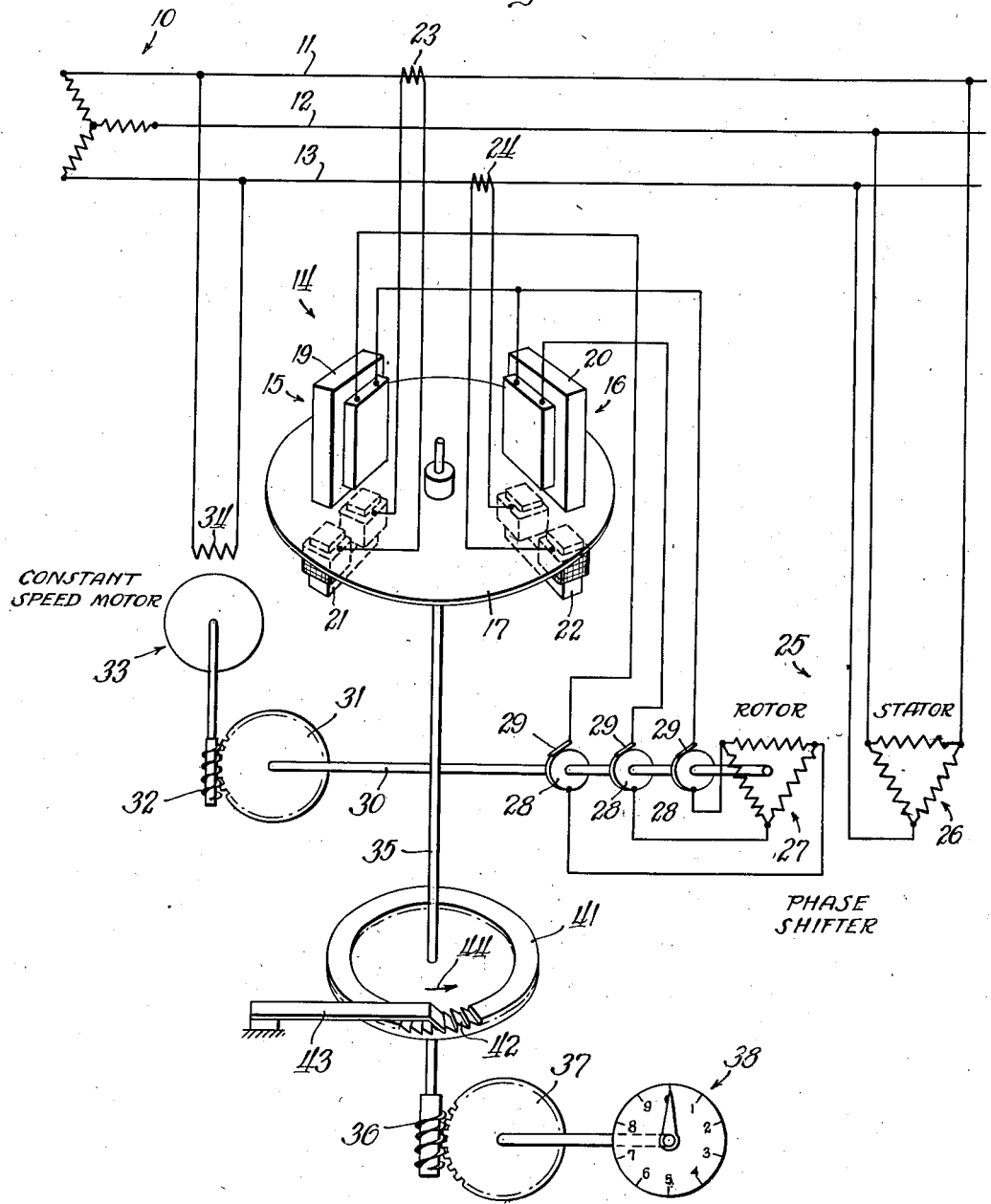

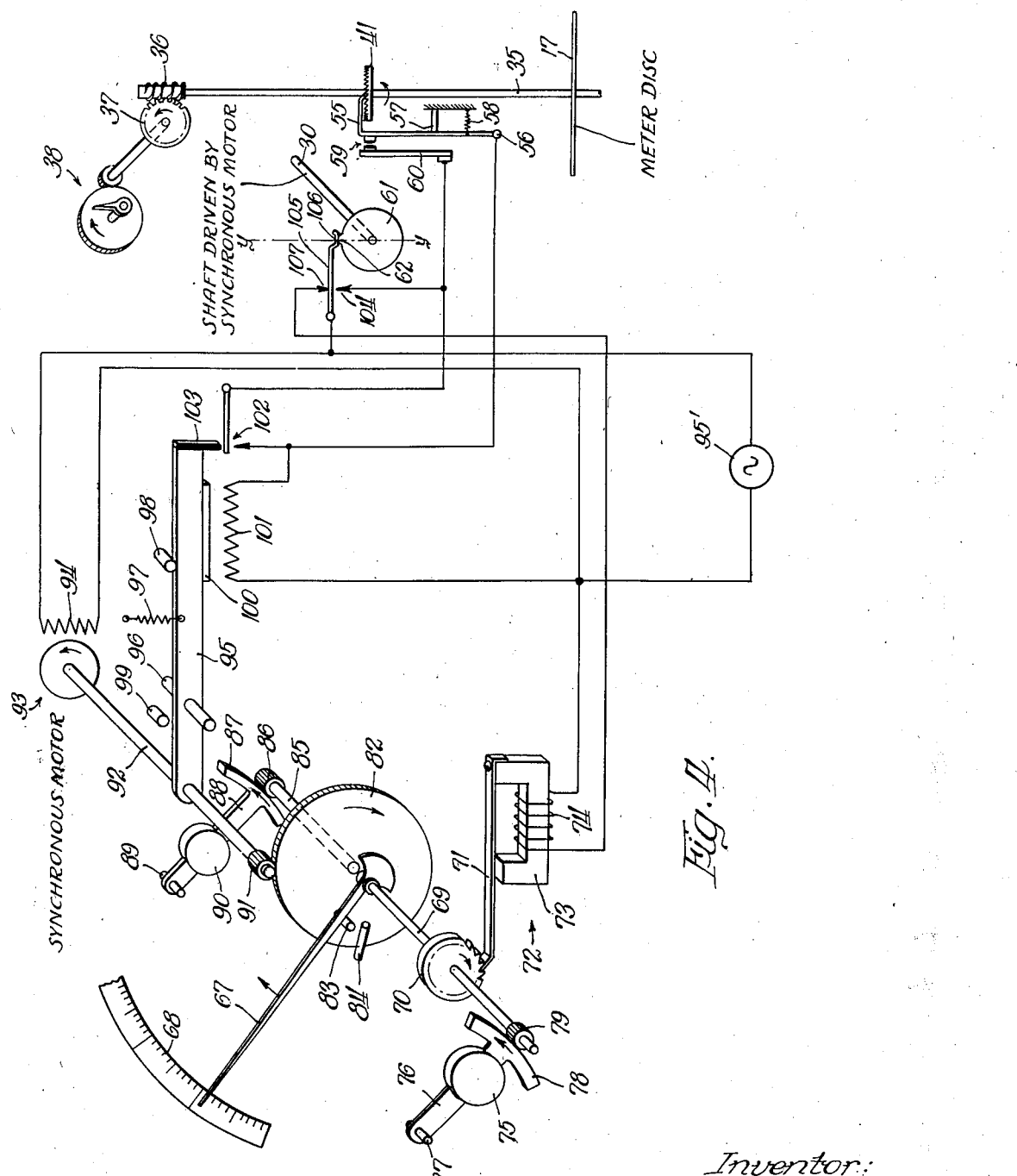

Patented Dec. 16, 1941

2,266,423

UNITED STATES PATENT OFFICE 2,266,423

ELECTRICAL MEASURING APPARATUS

Frederick C. Holtz, Springfield, Ill., assignor to Sangamo Electric Company, Springfield, Ill., a corporation of Illinois Application October 30, 1939, Serial No. 301,968

6 Claims. (Cl. 171—34)

My invention relates generally to electrical measuring apparatus and it has particular relation to apparatus for use in conjunction with alternating current circuits.

An object of my invention is to measure volt amperes in an alternating current circuit in a new and improved manner.

Another object of my invention is to continuously and progressively shift a current derived from the voltage or current of an alternating current circuit into all possible phase relations with a current derived from and in phase with the current or voltage of the alternating current circuit and to measure the combined effect of the phase shifted and in phase derived currents.

Another object of my invention is to measure the power factor of an alternating current circuit in a new and improved manner.

A still further object of my invention is to measure the angular shift from a fixed phase relation of the aforesaid phase shifted current to a zero position thereof.

Other objects of my invention will, in part, be obvious, and, in part, appear hereinafter.

For measuring the volt amperes in a polyphase circuit a polyphase watthour meter is employed. The current windings of the watthour meter units are connected to be energized in accordance with the current flowing in the circuit. The voltage windings are connected to the rotor of a polyphase phase shifter, the stator of which is energized in accordance with the voltage of the circuit. The rotor is driven at a constant speed so that during each revolution the phase relationship between the currents flowing through the current and voltage windings of the meter pass through all possible phase relationships. If it were not prevented, the meter disc would rotate first in a forward and then in a reverse direction during each revolution of the rotor. Pawl and ratchet means are provided for permitting rotation of the disc in one direction only. The revolutions of the disc in a forward direction are counted by the conventional watthour meter register, the reading of which indicates directly volt amperes.

In order to indicate the power factor of the circuit, the angular movement of the rotor of the phase shifter from a predetermined position to the position thereof when the torque applied to the meter disc is reversed is measured. The predetermined position of the phase shifter from which the angular movement is measured is preferably that position at which at unity power factor the meter disc rotates at a maximum speed in the forward direction.

In order to more clearly understand the nature and scope of my invention reference may be had to the following detailed description taken together with the accompanying drawings, in which:

Figure 1 illustrates diagrammatically one embodiment of my invention that can be used for measuring volt amperes in an alternating current circuit;

Figures 2 and 3 show curves which demonstrate certain characteristics of my invention;

Figure 4 illustrates diagrammatically apparatus that may be combined with the system shown in Figure 1 for measuring power factor; and Figure 5 is a view in front elevation of a typical power factor scale that may be used in conjunction with the power factor indication.

Referring now particularly to Figure 1 of the drawings, it will be observed that the reference character 10 designates, generally, a polyphase alternating current source that is arranged to energize conductors 11, 12 and 13. It will be understood that the source 10 can be any suitable alternating current source such as a 60 cycle source and that ordinarily transformers and switches will be interposed between it and the line conductors 11, 12 and 13.

With a view to measuring the volt amperes in the circuit represented by the conductors 11, 12 and 13, a polyphase meter, shown generally at 14, is provided. This meter may be of the type illustrated in Kurz Patent No. 2,119,015, where two watthour meter units are shown in cooperation with a single disc. Obviously, the conventional two-disc type of meter can be employed without departing from the scope of this invention.

As illustrated, the polyphase meter 14 comprises a pair of meter units, shown generally at 15 and 16, which cooperate in applying driving torque to a disc 17. Each of the meter units 15 and 16 is provided with a voltage element 19 and 20 and a current element 21 and 22, the voltage and current elements being located on opposite sides of the disc 17 in accordance with a conventional arrangement.

The windings on the current elements 21 and 22 are connected to the secondary windings 23 and 24, respectively, of current transformers, the primary windings of which are formed by the conductors 11 and 13 as illustrated. It will be understood that the current windings of the current elements 21 and 22 could be connected directly in the conductors 11 and 13, respectively, if desired.

Instead of connecting the windings of the voltage elements 19 and 20 to the conductors 11, 12 and 13 in the usual manner for measuring watts or watthours, these windings are connected through a polyphase phase shifter, shown generally at 25, to the conductors 11, 12 and 13. The phase shifter 25 comprises a stator 26 which may have polyphase delta connected windings that are connected to the line conductors 11, 12 and 13. For example, the stator 26 can be the stator of a conventional type of polyphase induction motor.

Cooperating with the stator 26 is a rotor, shown generally at 27, which may be provided with polyphase delta connected windings that are connected, as shown, to slip rings 28. The rotor 27 may be of the conventional type that is found in a wound rotor polyphase induction motor. Brushes 29 are arranged to engage the slip rings 28 for connecting the voltage windings of the voltage elements 19 and 20 to the rotor 27.

Instead of interposing the phase shifter 25 between the voltage windings of the voltage elements 19 and 20, these windings could be connected to be energized directly from the line conductors 11, 12 and 13. The phase shifter 25 would then be interposed between the current windings on the current elements 21 and 22 and, for example, the secondary windings 23 and 24 of the current transformers. For obvious reasons, however, it is preferable to employ the arrangement shown in Figure 1 of the drawings.

The slip rings 28 are mounted in insulated spaced relation together with the rotor 27 on a shaft 30 that carries a worm wheel 31 with which a worm 32 meshes. The worm 32 is driven at a constant speed by a constant speed motor, shown generally at 33, the winding 34 of which may be energized by being connected across line conductors 11 and 13. In the embodiment of the invention shown in Figure 1 it is only necessary that the motor 33 be a constant speed motor, but it need not be a synchronous motor. However, for another embodiment of the invention in which provision is made for measuring power factor a synchronous motor should be used for driving the rotor 27 of the phase shifter 25.

The disc 17 is mounted for rotation with a shaft 35 which carries a worm 36 for driving a worm wheel 37 that can be employed for driving a conventional register, a part of which is illustrated, generally, at 38.

As will hereinafter appear, the disc 17 tends to rotate in one direction during one-half of a revolution of the rotor 27 and in the opposite direction during the other half revolution. While suitable means could be employed for causing a forward movement of the register 38 for both directions of rotation of the disc 17, I prefer to permit rotation of the disc 17 in one direction only and to prevent its rotation in the opposite direction. For this purpose a detent or ratchet wheel 41 having teeth 42 is mounted for rotation with the shaft 35. A spring pawl 43 is arranged to cooperate with the teeth 42 in an obvious manner for permitting rotation of the detent or ratchet wheel 41 in the direction indicated by the arrow 44 and for preventing rotation thereof in the opposite direction.

It can be shown mathematically that the number of revolutions made by the meter disc 17 is independent of the speed of the rotor 27 of the phase shifter 25 and is a function of the volt amperes or the apparent power in the circuit based on the assumption, which for practical purposes is sound, that the power factor remains constant during each revolution of the rotor 27. One demonstration of the foregoing is illustrated by reference to the curve shown in Figure 2 and to the following equations in which the symbols used have these meanings:

$s$ = speed of watthour meter disc in revolutions per second
$W$ = volt ampere load or apparent power
$K$ = watthour meter constant
$w$ = angular speed of the rotor of the phase shifter in radians per second
$t$ = time
$T$ = total elapsed time in seconds
$N$ = total number of revolutions of watthour meter disc
$\theta$ = angular displacement of phase shifter from an assumed zero position
$P$ = speed of two pole phase shifter in revolutions per second $s = W/K \sin wt$ In a time interval $dt$ the meter makes
$s\,dt = W/K \sin wt\, dt$ revolutions
In the time T $$N = \int_{t=0}^{t=T} s\,dt = \frac{W}{K}\int_{t=0}^{t=T} \sin wt\, dt = -\frac{W}{K}\cos wt)\Big|_{t=0}^{t=T}$$

Letting $wt = \theta$, which equals $\pi$ for one-half revolution of the phase shifter, then $$N = \frac{2W}{Kw} = \frac{W}{K\pi P} \text{ because } P = \frac{w}{2\pi}$$

or $W/K\pi$ revolutions of the watthour meter disc per second since there are $P$ revolutions of the phase shifter in one second and
$W = K\pi N$ This shows that the number of revolutions of the meter disc 17 is independent of the speed of operation of the phase shifter 25 provided that, in any given time T, it completes an integral number of revolutions. It also shows that the number of revolutions of the disc 17 is a function only of the volt amperes or apparent power in the circuit, provided that the power factor remains constant during each revolution of the phase shifter. If the power factor varies rapidly, then the speed at which the phase shifter 25 rotates should be increased to provide a more accurate measurement. If the power factor changes slowly, as is usually the case, then the phase shifter 25 can operate at a fairly slow speed, for example six revolutions per minute.

Referring now particularly to the curve shown in Figure 2 of the drawings, it will be observed that it comprises two parts, 45 and 46, which together form a sine curve which is plotted with degrees angular displacement of the phase shifter abscissae and units of speed of the meter disc 17 as ordinates. Regardless of the power factor of the alternating current circuit represented by the conductors 11, 12 and 13, Figure 1, it will be understood that the sine curve comprising the sections 45 and 46 shows the relationship between the speed of the disc 17 and the rotor 27. As will be presently apparent, the particular relationship for different power factors will vary, but the relationship will always be represented by a sine curve when the rotor 27 is rotated at a constant speed and the power factor and volt amperes of the circuit represented by the conductors 11, 12 and 13 are constant throughout a revolution. The broken line portion 46 of the sine curve below the horizontal axis indicates that during one-half of a revolution of the rotor 27 the disc 17 has applied thereto a reverse torque. As previously indicated, it can be assumed that the conditions are constant during a complete revolution of the rotor 27. Therefore, it is satisfactory to employ only the movement of the disc 17 in one direction, as indicated by the curve 45 and then to use suitable constants or gear ratios between the worm 36 and the register 38, Figure 1, so that the register will indicate volt ampere hours for example.

The system shown in Figure 1 is, of course, a polyphase system. For operation on a single phase system a suitable reactance network can be provided for energizing the stator of a phase shifter with suitably phase displaced currents. A single phase rotor can be employed together with a single meter element cooperating with a disc to provide the desired measurement of volt amperes.

It will be recalled that the sine curve shown in Figure 2 represents the relationship between the speed of the disc 17 and the angular displacement of the rotor 27 of the phase shifter 25 for any power factor. As shown by the curves in Figure 3, the sine curve showing this relationship shifts along the horizontal axis depending upon the power factor at which the circuit is operating. These curves are plotted in the same units as the curve illustrated in Figure 2. In Figure 3, however, definite power factors are assigned to the sine curves. For example, the full line curve 50 represents the described relationship at unity power factor while the broken line curve 51 illustrates the relationship when the power factor is lagging by an angle $\phi$ of 15°.

For a reason which will be presently apparent, the zero point on the horizontal axis corresponds to the maximum speed of the meter disc at unity power factor. The maximum speed of the disc at a lagging power factor angle $\phi$ will then occur at a correspondingly further position of the rotor 27. When the rotor 27 has rotated through an angle of 90° from the assumed zero position when the meter disc speed is at a maximum at unity power factor, a reverse torque will be applied to the disc and, if unrestrained, it will rotate in a reverse direction. At a lagging power factor angle $\phi$ the meter disc will tend to reverse when the rotor of the phase shifter has been rotated from the assumed zero position at unity power factor through an angle 90—$\phi$. At zero power factor the meter disc will tend to reverse at the time when the rotor of the phase shifter occupies the assumed zero position that it would occupy at unity power factor. By measuring the angular movement of the rotor of the phase shifter from the assumed zero position at unity power factor to its position when the meter disc tends to reverse, it is possible to obtain an indication of the power factor angle and thereby the power factor of the circuit. This will be possible whether the power factor lags or leads. As previously indicated, at zero power factor lagging the meter disc tends to reverse when the rotor of the phase shifter occupies the position that it would occupy at unity power factor when the meter disc rotates at its maximum speed. At zero power factor leading it will be obvious that the rotor of the phase shifter will rotate through one-half a revolution before the meter disc tends to reverse its direction of rotation.

In Figure 4 of the drawings there is shown a system for measuring power factor which takes advantage of the foregoing relationships described in connection with the curves shown in Figure 3. It will be observed that the meter disc 17 carried by the shaft 35 is shown together with the register 38. Since it is obvious how the remaining cooperating elements shown in Figure 1 would be employed, they have been omitted for the sake of clarity. Instead of employing the pawl 43 for preventing reverse movement of the disc 17 an arm 55 is provided having a suitable nose for cooperating with the teeth of the detent or ratchet wheel 41 and it is pivoted at 56. Movement of the arm 55 in a clockwise direction is limited by a stop 57 and it is biased in this direction by means of a suitable tension spring 58. The arm 55 carries one of a pair of cooperating contact members 59 the other of which is carried by a stationarily mounted contact arm 60. The closure of the contact members 59 takes place at the time that the disc 17 tends to reverse its direction of rotation.

Mounted on the shaft 30 is a cam 61. In this embodiment of the invention the shaft 30 should be driven by a synchronous motor which can be energized, as shown in Figure 1, from the conductors 11 and 13. The cam 61 is provided with a lobe 62 which is illustrated in Figure 4 of the drawings as occupying a position along the vertical line or axis Y—Y.

The cam 61 is so positioned on the shaft 30 that the lobe 62 occupies the position shown along the axis Y—Y at the time that the meter disc 17 is rotating at its maximum speed when the power factor of the circuit comprising the conductors 11, 12 and 13 is unity. In other words, referring to the curve shown in Figure 3, the reference character 63 indicates the position of the rotor 27 of the phase shifter 25 at which at unity power factor the meter disc 17 will rotate at its maximum speed. This is the zero point that is employed for power factor measurement. The point designated by the reference character 64 corresponds to the position of the rotor 27 of the phase shifter 25 when, at the lagging power factor angle $\phi$ the contact members 59 are closed as a result of the application of reverse torque to the meter disc 17. It then remains to provide means for measuring this angular movement of the rotor of the phase shifter and to translate it into power factor indications.

With a view to indicating the power factor a pointer 67 is arranged to cooperate with a scale 68, the calibration of which is illustrated more clearly in Figure 5, and it is mounted for rotation with a shaft 69. On the shaft 69 there is provided a ratchet wheel or friction disc 70 with which a pawl 71 of magnetic material cooperates to permit rotation only in one direction, except under certain conditions. As shown, the pawl 71 forms a part of an electromagnet, illustrated generally at 72, which comprises a generally U-shaped core 73 having a winding 74 thereon. On energization of the winding 74 the pawl 71 is attracted and is thereby moved out of register with the teeth of the ratchet wheel or friction disc 70 and thereby is ineffective as long as it is withheld to prevent reverse rotation of the pointer 67.

In order to effect reverse rotation of the pointer 67 a weight 75 is provided on a sector arm 76 that is pivoted at 77 and carries a toothed sector 78 which cooperates with a pinion 79 on the shaft 69. When the pawl 71 is moved out of engagement with the teeth of the ratchet wheel or friction disc 70, as described, the weight 75 biases the pointer 67 for movement in a reverse direction.

Movement of the pointer 67 in a forward direction is effected by means of a gear wheel 82 which carries transversely thereof a pusher arm 83 that is arranged to engage the pointer 67 and move it forwardly along the scale 68. The zero position of the gear wheel 82 is determined by a stop 84 against which the pusher arm 83 comes to rest in the zero position. The gear wheel 82 is mounted for rotation with a shaft 85 which is coaxial with the shaft 69 and carries a pinion 86 which meshes with the teeth of a sector 87 forming a part of a sector arm 88 that is pivoted at 89. A suitable weight 90 is carried by the sector arm 88 and serves to bias the gear wheel 82 in a reverse direction.

In order to drive the gear wheel 82 in a forward direction a pinion 91 is arranged to be placed in driving engagement therewith. The pinion 91 and the shaft 92 are driven by means of a synchronous motor shown generally at 93 and having a winding 94 that may be energized from a suitable alternating current source 95' which is preferably the same as the alternating current source 10, Figure 1. For accuracy in operation the synchronous motor which drives the phase shifter 25 and the cam 61 and the synchronous motor which drives the shaft 92 should be energized from a common source for obvious reasons.

The shaft 92 is mounted for rotation at one end of an arm 95 that is pivoted at 96 and has a limited degree of movement sufficient to permit disengagement of the pinion 91 from the gear wheel 82. A tension spring 97 serves to bias the arm 95 in a counterclockwise direction, to permit engagement between the pinion 91 and the gear wheel 82, this movement being limited by a stop 98. A stop 99 serves to limit the movement of the arm 95 in a clockwise direction.

With a view to moving the arm 95 for disengaging the pinion 91 from the gear wheel 82 a plate 100 of suitable magnetic material is carried by the arm 95 and is arranged to be attracted on energization of a winding 101. It will be observed that the winding 101 is connected for energization to the alternating current source 95' through the contact members 59 and through contact members 102 which are closed by a finger 103 carried at one end of the arm 95.

The circuit from the contact members 59 and 102 connected in parallel to the alternating current source 95' is completed on engagement with a stationary contact member 104 of a contact member 105 having a portion 106 which engages the cam 61. Except when the lobe 62 lifts the contact arm 105 out of engagement with the contact member 104, the circuit to the contact members 59 and 102 from the source 95' is completed. When the contact arm 105 is lifted out of engagement with the contact member 104 it engages another stationary contact member 107 for completing an obvious energizing circuit for the winding 74 of the electromagnet 72.

In operation it will be assumed that the system illustrated in Figure 1 of the drawings is operating at a power factor less than unity and that the cam 61 is in the position shown in Figure 4. At that time the stationary contact member 107 has been engaged by the contact arm 105 and the winding 74 momentarily energized. The pawl 71 is moved out of engagement with the ratchet wheel or friction disc 70 and the pointer 67 is rotated in a counterclockwise direction by the biasing force of the weight 75.

When the contact arm 105 was lifted by the lobe 62 to the position shown in Figure 4 the circuit for energizing the winding 101 was opened, thereby permitting the arm 95 to be moved in a counterclockwise direction by the spring 97 to place the pinion 91 in driving engagement with the gear wheel 82. The pusher arm 83 is then advanced from the zero position against the stop 84 and picks up the pointer 67 in its reverse rotation, as described, and advances it along the scale 68. During this interval it will be understood that the sector 78, ratchet wheel or friction disc 70, gear wheel 82, pointer 67, sector 87 and motor 93 will be rotating in the directions indicated by the arrows thereon.

The pointer 67 will continue to advance along the scale 68 until the meter disc 17 has applied thereto a reverse torque which causes it to reverse and close the contact members 59. Movement in a reverse direction of the disc 17 other than that which is sufficient to effect closure of the contact members 59 is prevented. On closure of contact members 59 an energizing circuit for the winding 101 is completed, since contact arm 105 engages stationary contact member 104, and the arm 95 is moved in a clockwise direction, thereby disengaging the pinion 91 from the gear wheel 82. The gear wheel 82 is then promptly returned to the zero position under the influence of the weight 90. However, the pointer 67 remains in the position to which it has been operated until the lobe 62 again lifts the contact arm 105 to engagement with the stationary contact member 107 and again completes the energizing circuit for the winding 74 of the electromagnet 72. At a minimum then the pointer 67 will be stationary during one-half of a revolution of the cam 61. With the power factor at unity or less it will remain stationary during at least three-fourths of a revolution of the cam 61.

In Figure 5 of the drawings a suitable calibration in terms of power factor lag and lead is illustrated. It will be recalled that the movement of the pointer 67 is proportional to 90 minus the power factor angle. That is, when the power factor angle is 15° lagging, the pointer 67 will occupy a position which is 75° removed from the zero position. By calibrating the scale shown in Figure 5 in units of power factor as is conventional, instead of units of power factor angle, it is possible to get a fairly open scale in the regions on both sides of unity power factor. Since it is in these regions that commercial power systems usually operate, it will be apparent that it is a decided advantage to have this arrangement.

If it is desired to indicate maximum power factor, considering zero power factor lagging to be a minimum, it is only necessary to omit the gear sector 78 and the associated parts which tend to periodically return the pointer 67. This pointer would then remain in the highest position to which it had been operated by the pusher arm 83.

If desired, the pointer 67 could itself operate as a pusher arm and in turn move a friction pointer over the scale 68 which would remain in any position to which it had been operated.

Since certain further changes may be made in the foregoing constructions and different embodiments of the invention can be made without departing from the scope thereof, it is intended that all matter shown in the accompanying drawings and described hereinbefore shall be interpreted as illustrative and not in a limiting sense.

I claim:

1. Apparatus for measuring the power factor of an alternating current circuit comprising, in combination, watthour meter means including voltage and current elements and a disc adapted to be driven by the interaction thereof, circuit means directly connecting one of said elements to said alternating current circuit, rotatable phase shifting means and circuit means for interconnecting the other of said elements and said alternating current circuit, driving means for operating said phase shifting means to apply torque to said disc acting in one direction during part of a given interval and acting in the opposite direction during the balance of said interval, and means for measuring the extent of movement of said driving means from a predetermined position until a reverse torque is applied to said disc to provide an indication of the power factor of said alternating current circuit.

2. Apparatus for measuring the power factor of an alternating current circuit comprising, in combination, a rotatable disc and means for periodically applying torque thereto in opposite directions in accordance with the volt amperes in said alternating current circuit, a rotatable member and means for rotating the same through one revolution during which one cycle of torque application to said disc is being completed, and means for measuring the time required for rotation of said rotatable member from a predetermined position until the application of torque to said disc is reversed to provide an indication of the power factor of said alternating current circuit.

3. Apparatus for measuring the power factor of an alternating current circuit comprising, in combination, a rotatable disc and means for periodically applying torque thereto in opposite directions in accordance with the volt amperes in said alternating current circuit, a rotatable member and means for rotating the same through one revolution during which one cycle of torque application to said disc is being completed, indicating means movable from an initial position to positions corresponding to the power factor of said alternating current circuit, means controlled by said rotatable member for moving said indicating means from its initial position, and means controlled by said disc for stopping said indicating means on the application of reverse torque to said disc.

4. Apparatus for measuring the power factor of an alternating current circuit comprising, in combination, a rotatable disc and means for periodically applying torque thereto in opposite directions in accordance with the volt amperes in said alternating current circuit, a rotatable member and means for rotating the same through one revolution during which one cycle of torque application to said disc is being completed, indicating means movable from an initial position to positions corresponding to the power factor of said alternating current circuit, means controlled by said rotatable member for moving said indicating means from its initial position, means controlled by said disc for stopping said indicating means on the application of reverse torque to said disc, and means automatically restoring said indicating means to its initial position when movement of said indicating means is arrested.

5. Apparatus for measuring the power factor of an alternating current circuit comprising, in combination, a rotatable disc and means for periodically applying torque thereto in opposite directions in accordance with the volt amperes in said alternating current circuit, a rotatable member and means for rotating the same through one revolution during which one cycle of torque application to said disc is being completed, indicating means movable from an initial position to positions corresponding to the power factor of said alternating current circuit, means controlled by said rotatable member for moving said indicating means from its initial position, means controlled by said disc for stopping said indicating means on the application of reverse torque to said disc, means automatically restoring said indicating means to its initial position when movement of said indicating means is arrested, a pointer, and means for operatively interconnecting said indicating means and said pointer whereby the latter is moved on movement of the former.

6. Apparatus for measuring the power factor of an alternating current circuit comprising, in combination, a rotatable disc and means for periodically applying torque thereto in opposite directions in accordance with the volt amperes in said alternating current circuit, a rotatable member and means for rotating the same through one revolution during which one cycle of torque application to said disc is being completed, indicating means movable from an initial position to positions corresponding to the power factor of said alternating current circuit, means controlled by said rotatable member for moving said indicating means from its initial position, means controlled by said disc for stopping said indicating means on the application of reverse torque to said disc, means automatically restoring said indicating means to its initial position when movement of said indicating means is arrested, a pointer and a scale relative to which the same is movable, means for operatively interconnecting said indicating means and said pointer whereby the latter is moved on movement of the former, means for holding said pointer in any position to which it may be moved by said indicating means, means for releasing said holding means when said rotatable member occupies a predetermined position, and means for automatically restoring the operative connection between said indicating means and said pointer on release of said holding means.

FREDERICK C. HOLTZ.